Sept. 6, 1955     G. A. LYON     2,717,059
WHEEL STRUCTURE
Filed Sept. 11, 1951     2 Sheets-Sheet 1
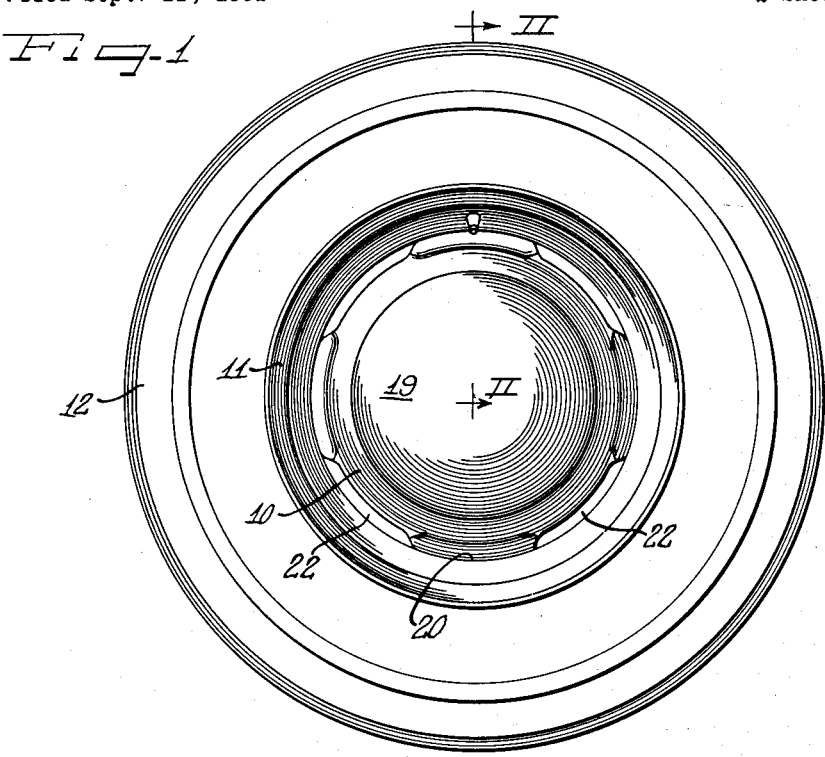
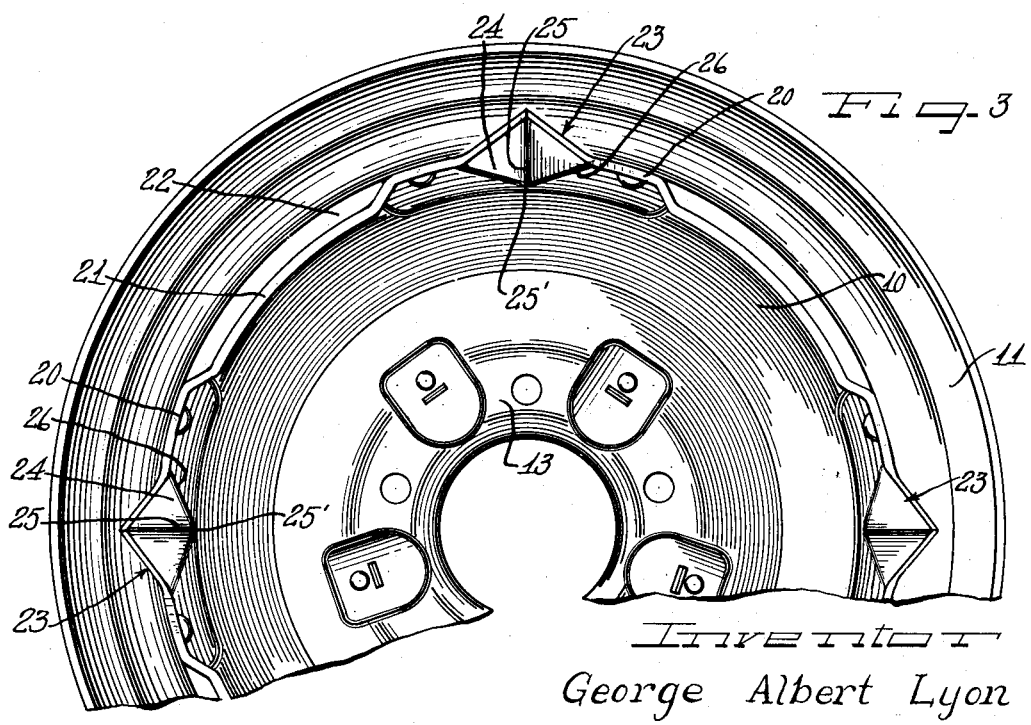
Inventor
George Albert Lyon

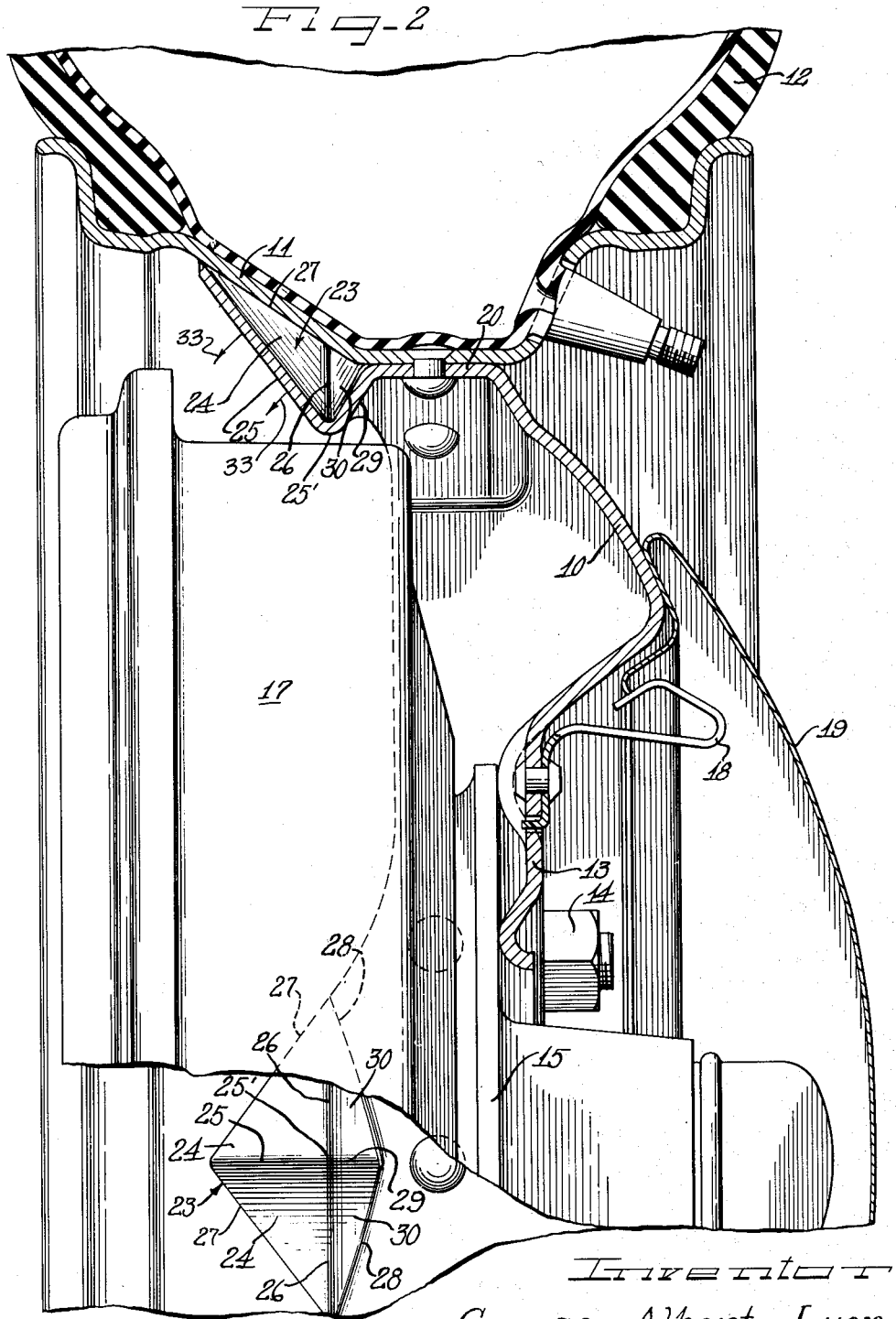

United States Patent Office 2,717,059
Patented Sept. 6, 1955

2,717,059

WHEEL STRUCTURE

George Albert Lyon, Detroit, Mich.

Application September 11, 1951, Serial No. 246,131

7 Claims. (Cl. 188—264)

The present invention relates to improvements in wheel structures and more particularly concerns improvements in wheels of the kind that are adapted for use in automotive vehicles such as automobiles.

This application is a continuation in part of my copending application entitled "Wheel Structure," Serial No. 110,097, filed August 13, 1949 and now abandoned.

In the usual automobile wheel construction, a brake drum is concentrically substantially encompassed within the axially inner side of the wheel proper and is therefore substantially isolated from the air which moves past the sides of the wheel during travel of the associated wheel. As a result, the air about the brake drum tends to stagnate and overheating of the brake drum from the drag or action of the brake shoe mechanism within the drum may occur.

An important object of the present invention is to provide means in a wheel structure for avoiding stagnation of the air about a brake drum.

Another object of the invention is to provide improved means for promoting circulation of cooling air about the brake drum within a vehicle wheel structure.

A further object of the invention is to provide improved means in a vehicle wheel structure for promoting circulation of brake drum cooling air therethrough.

According to the general features of the present invention there is provided in a wheel structure comprising a wheel body and a tire rim, wherein the wheel body has air circulation openings, integral portions of the wheel body extending axially inwardly from the tire rim and affording air agitating and brake drum cooling air circulation promoting vanes.

According to other general features of the invention, there is provided in a brake drum and wheel assembly wherein a brake drum subject to heating in operation is encompassed in spaced relation by a multi-flange tire rim and a wheel body carying the tire rim is secured at the outer side of the wheel drum, the wheel body having air circulation openings therethrough and axially inwardly extending air circulation promoting extensions on the wheel body alternating with said air circulation openings and extending into the space between the brake drum and the tire rim for agitating the air in such space and promoting cooling circulation of air about the brake drum.

Other objects, features, and advantages of the present invention will be readily apparent from the following detailed description of a preferred embodiment thereof taken in conjunction with the accompanying drawings, in which:

Figure 1 is an outer side elevational view of a vehicle wheel embodying the features of the invention;

Figure 2 is an enlarged fragmentary radial sectional detail view taken substantially on the line II—II of Figure 1; and Figure 3 is a fragmentary inner side elevational view of the vehicle wheel removed from the brake drum.

As shown on the drawings:

A vehicle wheel in which the present invention is adapted to be incorporated comprises a wheel spider or body 10 and a tire rim 11 which is preferably of the multi-flanged drop center type carrying a pneumatic tire and tube assembly 12. The wheel body has a central bolt-on flange 13 arranged to be secured by conventional attachment bolts or screws 14 to a vehicle axle hub structure 15 which may form part of or carry a brake drum 17 within which a preferred form of brake mechanism including the customary brake shoes acting upon the drum may be operative.

By preference, the wheel body 10 comprises a metallic disk structure centrally apertured for clearance of the wheel hub and appropriately perforated for the attachment bolts, with the bolt-on flange 13 carrying retaining clips 18 for retaining a hub cap 19 in covering relation to the central portion of the wheel. The wheel body may be formed from appropriate gauge sheet metal stamped to shape.

At its periphery the wheel body 10 has a generally axially inwardly extending flange 20 by which the wheel body is secured to the base flange of the tire rim 11 as by welding or riveting. At appropriate intervals, such as four equally spaced intervals, the attachment flange 20 is formed with insets 21 providing air circulation wheel openings 22. These openings are for the purpose of permitting circulation of air through the wheel for cooling the brake drum 17.

However, in spite of the air circulation wheel openings 22, insufficient circulation of air for adequate cooling of the brake drum 17 has been experienced. This apparently results from the fact that due to the considerable width of the tire rim 11 and the pneumatic tire assembly 12 which has a side wall spread beyond the extremities of the terminal flanges of the tire rim, and more especially at the inner side of the wheel, the brake drum 17 is entirely circumferentially encompassed in spaced relation by the tire rim and tire assembly and as a result is substantially shielded from the slip stream of air moving past the wheel assembly in the forward movement of the vehicle during operation. There also appears to be a tendency for the air in the space about the brake drum between the brake drum and the surrounding inner portion of the tire rim to stagnate as a result of the shielded condition prevailing and therefore the brake drum is inadequately cooled.

According to the present invention, the wheel body 10 is provided with novel means for agitating the air in the air circulation space about the brake drum 17 and for promoting the circulation of air through said space and through the air circulation openings 22 provided by the wheel body. To this end, those portions of the wheel body circumferential flange 20 which intervene between the wheel openings 22 are formed with generally axially inward wing extensions 23 of a length to oppose at least a substantial portion of the width of the brake drum. The extensions 23 thus extend between the brake drum 17 and the adjacent flange portion of the tire rim 11 and are in position to at least effect substantial agitation of the air within the air circulation space about the brake drum so as to avoid stagnation of the air.

In order to promote active air circulation, and more particularly circulation of air through the wheel openings 22 in a generally axial direction in cooling relation about and past the brake drum 17, each of the extensions 23 is preferably formed to provide air moving vane structure. As best seen in Figures 2 and 3, the extensions are for this purpose formed with angular vane portions 24 tilted in opposite directions and generally toward the axially and radially inner side of the wheel so that as the wheel rotates the vanes 24 will act as impellers to effect movement of the air axially and radially inwardly as indicated by arrows 33 in Figure 2 about and against the brake drum 17, sucking air in through the wheel openings 22 to exhaust at the axially inner side of the wheel. This is effected by bending the extensions 23 radially inwardly at their longitudinal axis to form a longitudinal crimp 25 and also adjacent the base of each extension to form transverse crimps 26, the longitudinal crimp 25 extending generally axially inwardly and radially outwardly diagonally from the extremity 25' of the longitudinal bend line and the transverse crimp 26 extending generally transversely and radially outwardly diagonally from the extremity 25'.

The longitudinal and transverse crimps 25, 26 thus form the radially inwardly sloping converging edges of a pyramid with apex 25' and of generally triangular base defined by the radially outermost margins of the vane structure including the axially inwardly converging radially outer margins 27 of the vane portions 24 and the axially outwardly converging radially outer margins 28 between the flange 20 and the extensions 23. The margins 28 are best seen in Figure 2 by referring to the lower extension 23 shown in elevation at the bottom of the drawing. Thus the extensions 23 may each have a further longitudinal crimp 29 extending axially outwardly and radially outwardly diagonally from the extremity 25', the crimps 26 and 29 and margins 28 defining axially outer, sloping triangular wall portions 30.

By forming the air moving extensions 23 of more or less arrowhead shape and with the vane portions 24 substantially equally proportioned and tipping in respectively opposite directions, the air circulation expedient operates efficiently interchangeably at either side of the vehicle to which the wheel may be applied. The generally triangular or arrowhead shape affords sufficient area in the vanes 24 for efficient operation without obstructing the air passage from the cooling space about the brake drum to the wheel openings 22. It will also be observed that the particular shape of the air circulation extensions 23 is adapted to afford maximum strength, the longitudinal bend crease 25 and the vane tilting crimps 26 and the further crimp 29 providing reinforcing ribs in the air circulation extensions.

It will thus be apparent that as the wheel rotates the air circulation extensions 23 act to agitate and impel the air in the space between the brake drum and the tire rim into movement and more particularly into a generally helical movement sweeping radially inwardly and axially inwardly around and against the brake drum 17 from the axially outer side of the brake drum sucking air through the wheel openings 22, thus effectively cooling the brake drum in operation of the vehicle.

It will be understood that modifications and variations may be effected without departing from the scope of the novel concepts of the present invention.

I claim as my invention:

1. In a wheel structure including a tire rim and a wheel body having brake drum cooling air circulation openings therein defined by marginal structure on the wheel body, air circulation vane elements extending from the wheel body adjacent to the wheel openings toward the inner side of the wheel, the wheel body comprising a sheet metal stamping and the vane elements being formed as integral marginal extensions of portions of the wheel body intermediate the wheel openings and independent of the marginal structure of the wheel body about the respective openings.

2. A wheel structure comprising a tire rim and a load sustaining body portion, the body portion being formed as a sheet metal stamping having marginal inset areas defining air circulation openings between the wheel body and the tire rim, marginal portions of the wheel body intermediate the wheel opening insets and independently of said insets being secured to the tire rim, said marginal portions having extensions thereon projecting toward the inner side of the wheel, said projections being tilted to provide air circulation vanes.

3. A wheel structure comprising a tire rim and a load sustaining body portion, the body portion being formed as a sheet metal stamping having marginal inset areas defining air circulation openings between the wheel body and the tire rim, marginal portions of the wheel body intermediate the wheel opening insets being secured to the tire rim, said marginal portions having extensions thereon projecting toward the inner side of the wheel, said extensions being substantially arrowhead-shaped and being longitudinally creased and turned into divergent vane areas.

4. A wheel structure comprising a tire rim and a load sustaining body portion, the body portion being formed as a sheet metal stamping having marginal inset areas defining air circulation openings between the wheel body and the tire rim, marginal portions of the wheel body intermediate the wheel opening insets being secured to the tire rim, said marginal portions having extensions thereon projecting toward the inner side of the wheel, said extensions being substantially arrowhead-shaped and being longitudinally creased and turned into divergent vane areas, said vane areas having respective divergent base crimps therein effecting a tilt of the vane sections toward the brake drum.

5. A wheel structure comprising a tire rim and a load sustaining body portion, the body portion being formed as a sheet metal stamping having marginal portions secured to the tire rim, said marginal portions having generally axially directed extensions thereon, and said extensions being substantially arrowhead-shaped and being longitudinally creased and turned into divergent vane areas.

6. A wheel structure comprising a tire rim and a load sustaining body portion for attachment in operative relation to a brake drum, the body portion being formed as a sheet metal stamping having marginal portions secured to the tire rim, said marginal portions having extensions thereon projecting toward the inner side of the wheel, said extensions being substantially arrowhead-shaped and being longitudinally creased and turned into divergent vane areas, said vane areas having respective divergent base crimps therein effecting a tilt of the vane sections toward the brake drum.

7. In a wheel structure including a multi-flange tire rim having a base flange and a side flange angularly related thereto, a stamped one-piece heavy gauge sheet metal disk-spider wheel body providing openings through the wheel and having a marginal flange extending generally axially and attached in supporting relation to said rim base flange, and said marginl flange having integrally stamped out therewith and projecting from its edge and beyond said rim base flange individual circumferentially spaced angled air motivating vane extensions disposed adjacent to and opposing said rim side flange.

References Cited in the file of this patent

UNITED STATES PATENTS

| | | |
|---|---|---|
| 1,665,437 | Booth | Apr. 10, 1928 |
| 1,674,537 | Williams | June 19, 1928 |
| 1,730,490 | Winchester | Oct. 8, 1929 |
| 1,906,737 | Burgess | Nov. 7, 1933 |
| 1,934,443 | Norton | Nov. 7, 1933 |
| 1,957,654 | La Brie | May 8, 1934 |
| 2,022,153 | Rogers | Nov. 26, 1935 |
| 2,065,088 | Mueller | Dec. 22, 1936 |
| 2,088,967 | Main | Aug. 3, 1937 |
| 2,105,317 | Frank | Jan. 11, 1938 |
| 2,133,597 | Tjaarda | Oct. 18, 1938 |
| 2,179,656 | Eksergian | Nov. 14, 1939 |
| 2,231,931 | Lyon | Feb. 18, 1941 |
| 2,414,156 | Malthaner | Jan. 14, 1947 |
| 2,441,008 | Chase | May 4, 1948 |
| 2,599,707 | Gandelot | June 10, 1952 |

FOREIGN PATENTS

| | | |
|---|---|---|
| 707,113 | Germany | June 13, 1941 |
| 787,597 | France | Sept. 25, 1935 |